US007353079B2

(12) United States Patent
Rodriguez

(10) Patent No.: US 7,353,079 B2
(45) Date of Patent: Apr. 1, 2008

(54) VENDING SYSTEM FOR PERSONALIZED PET COLLARS AND METHOD THEREFOR

(76) Inventor: William Rodriguez, 3014 E. Amber Ridge Way, Phoenix, AZ (US) 85048

(*) Notice: Subject to any disclaimer, the term of this patent is extended or adjusted under 35 U.S.C. 154(b) by 212 days.

(21) Appl. No.: 11/346,091

(22) Filed: Feb. 2, 2006

(65) Prior Publication Data

US 2007/0179667 A1 Aug. 2, 2007

(51) Int. Cl.
*G06F 17/00* (2006.01)

(52) U.S. Cl. ........................ 700/233; 221/92; 221/133; 221/135; 221/155

(58) Field of Classification Search ................. 700/233
See application file for complete search history.

(56) References Cited

U.S. PATENT DOCUMENTS 5,569,003 A 10/1996 Goldman et al.
5,653,197 A * 8/1997 Massaro et al. ............ 119/858
6,082,580 A * 7/2000 Mueller et al. ............. 221/226
6,473,666 B1 * 10/2002 Samura ...................... 700/117
6,886,715 B2 * 5/2005 Lennox ....................... 221/92

* cited by examiner

*Primary Examiner*—Gene O. Crawford
*Assistant Examiner*—Timothy Waggoner
(74) *Attorney, Agent, or Firm*—Veronica-Adele R. Cao; Weiss & Moy, P.C.

(57) ABSTRACT

A vending system for personalized pet collars. The vending system allows a user to conveniently personalize pet collars with letter, number, and design charms. The user may select a pet collar along with any charms. The user may also select the placement of each charm so that letter and number charms may be combined to indicate the pet's name or the pet owner's phone number and/or address.

20 Claims, 4 Drawing Sheets

VENDING SYSTEM FOR PERSONALIZED PET COLLARS AND METHOD THEREFOR

FIELD OF THE INVENTION

This invention relates generally to pet accessories, and more specifically, to a vending system for personalized pet collars.

BACKGROUND OF THE INVENTION

Pet owners for many years have sought different ways to personalize their pet's accessories. Because the pet collars that are available in the market are somewhat plain, many pet owners have accessorized their pets with pet shirts, sweaters, and/or hats. Some pet owners have also attempted to decorate the otherwise plain collars with beads, fabric, bows, and other trinkets. However, personalizing a pet collar in such a manner may prove to be time consuming and cumbersome for a pet owner that possesses neither the time nor the skill to do so. A pet owner may also order a personalized pet collar from a company that specializes in making them; however, doing so may prove to be expensive.

Therefore a need exists for a vending system that allows pet owners to conveniently personalize pet collars. Preferably, the vending system would allow the pet owner to personalize the pet collar with information about the pet's identity, such as the pet's name or the pet owner's phone number and/or address. The vending system would further preferably allow the pet owner to personalize the pet collar with decorative charms. Still further preferably the vending system will allow the pet owner to select from the available colors and sizes of the pet collars.

SUMMARY OF THE INVENTION

It is an object of the present invention to provide a vending system that allows a pet owner to conveniently personalize pet collars.

It is another object of the present invention to provide a vending system that allows the pet owner to personalize the pet collar with information about the pet's identity, such as the pet's name or the owner's phone number and/or address.

It is still another object of the present invention to provide a vending system that allows the pet owner to personalize the pet collar with decorative charms.

It is yet another object of the present invention to provide a vending system that allows the owner to select from the available colors and sizes of the pet collars.

BRIEF DESCRIPTION OF THE PREFERRED EMBODIMENT

In accordance with one embodiment of the present invention, a vending system for personalized pet collars is disclosed. The vending system comprises a vending machine housing containing a plurality of pet collars and a plurality of charms to be coupled to the pet collars, at least one pet collar storage area within the housing that is dimensioned to store the plurality of pet collars, at least one charm storage area within the housing that is dimensioned to store the plurality of charms, a payment acceptor mechanism capable of receiving payment from a user and providing change to the user, a user interface mechanism for prompting the user to enter information corresponding to at least one of a pet collar selected by the user from the plurality of pet collars and at least one charm selected by the user from the plurality of charms, a control mechanism for receiving the information and for locating the pet collar selected by the user and for locating the at least one charm selected by the user and for generating drive signals, a retrieval mechanism for responding to at least one of the drive signals and for retrieving the pet collar selected by the user from the at least one pet collar storage area and for retrieving the at least one charm selected by the user from the at least one charm storage area and for placing the pet collar selected by the user and the at least one charm selected by the user in position for assembly, an assembly mechanism for responding to at least one of the drive signals and for coupling the at least one charm selected by the user to the pet collar selected by the user, and a dispensing mechanism for responding to at least one of the drive signals and for dispensing a completed personalized pet collar.

In accordance with another embodiment of the present invention, a vending system for personalized pet collars is disclosed. The vending system comprises: a substantially transparent vending machine housing; at least two types of pet collars, each type varying in at least one of size, style, and color; at least two types of charms to be riveted to the pet collars, each type of charm varying in at least one of size, style, and color; a plurality of refillable pet collar storage areas, each pet collar storage area being dimensioned to store one type of pet collar; a plurality of refillable charm storage areas, each charm storage area being dimensioned to store one type of charm; a payment acceptor mechanism capable of at least one of receiving payment from a user and providing change to the user; a user interface mechanism prompting a user to enter information corresponding to at least one of a pet collar selected by the user from the plurality of pet collars, at least one charm selected by the user from the plurality of charms, and placement of the at least one charm selected by the user on the pet collar selected by the user; a control mechanism for receiving the information and for locating the pet collar selected by the user and for locating the at least one charm selected by the user and for generating drive signals; a retrieval mechanism for responding to at least one of the drive signals and for retrieving the pet collar selected by the user from the at least one pet collar storage area and for retrieving the at least one charm selected by the user from the at least one charm storage area and for placing the pet collar selected by the user and the at least one charm selected by the user in position for assembly; an assembly mechanism to respond to at least one of the drive signals and to rivet the at least one charm selected by the user to the pet collar selected by the user; and a dispensing mechanism for responding to at least one of the drive signals and for dispensing a completed personalized pet collar.

In accordance with yet another embodiment of the present invention, a method of personalizing a pet collar is disclosed. The method comprises the steps of providing a vending system comprising: a vending machine housing containing a plurality of pet collars and a plurality of charms to be coupled to the pet collars; at least one pet collar storage area within the housing dimensioned to store the plurality of pet collars; at least one charm storage area within the housing dimensioned to store the plurality of charms; a payment acceptor mechanism capable of at least one of receiving payment from a user and providing change to the user; a user interface mechanism for prompting the user to enter information corresponding to at least one of a pet collar selected by the user from the plurality of pet collars and at least one charm selected by the user from the plurality of charms; a control mechanism for receiving the information and for locating the pet collar selected by the user and for locating the at least one charm selected by the user and for generating drive signals; a retrieval mechanism for responding to at least one of the drive signals and for retrieving the pet collar selected by the user from the at least one pet collar storage area and for retrieving the at least one charm selected by the user from the at least one charm storage area and for placing the pet collar selected by the user and the at least one charm selected by the user in position for assembly; an assembly mechanism for responding to at least one of the drive signals and for coupling the at least one charm selected by the user to the pet collar selected by the user; and a dispensing mechanism for responding to at least one of the drive signals and for dispensing a completed personalized pet collar. The method further comprises the steps of receiving payment from the user by the payment acceptor mechanism; receiving the information entered by the user into the user interface mechanism, the information corresponding to at least one of the pet collar selected by the user from the plurality of pet collars and the at least one charm selected by the user from the plurality of charms; the control mechanism locating the pet collar selected by the user and the at least one charm selected by the user; generating drive signals by the control mechanism; the retrieval mechanism retrieving the pet collar selected by the user from the at least one pet collar storage area and placing the pet collar selected by the user in position for assembly, retrieving the at least one charm selected by the user from the at least one charm storage area and placing the at least one charm selected by the user in position for assembly; the assembly mechanism coupling the at least one charm selected by the user to the pet collar selected by the user, and the dispensing mechanism dispensing a completed personalized pet collar for retrieval by the user.

DETAILED DESCRIPTION OF THE PREFERRED EMBODIMENTS

Figure 1:
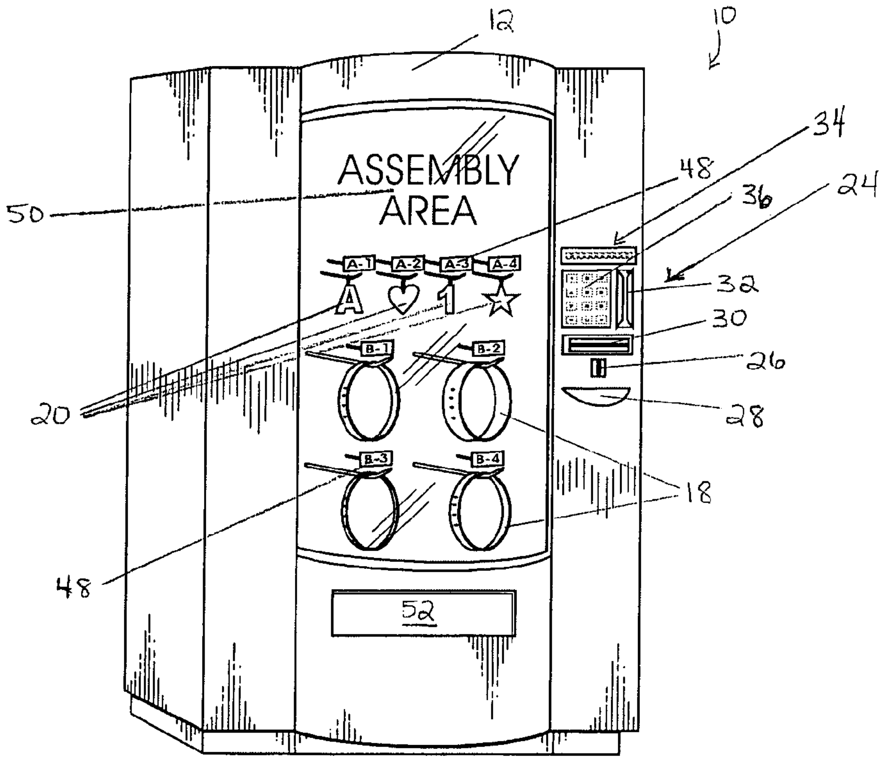
FIG. 1 is a perspective view of one embodiment of a vending system of the present invention. An assembly area is shown as being visible to a user.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

Figure 2:
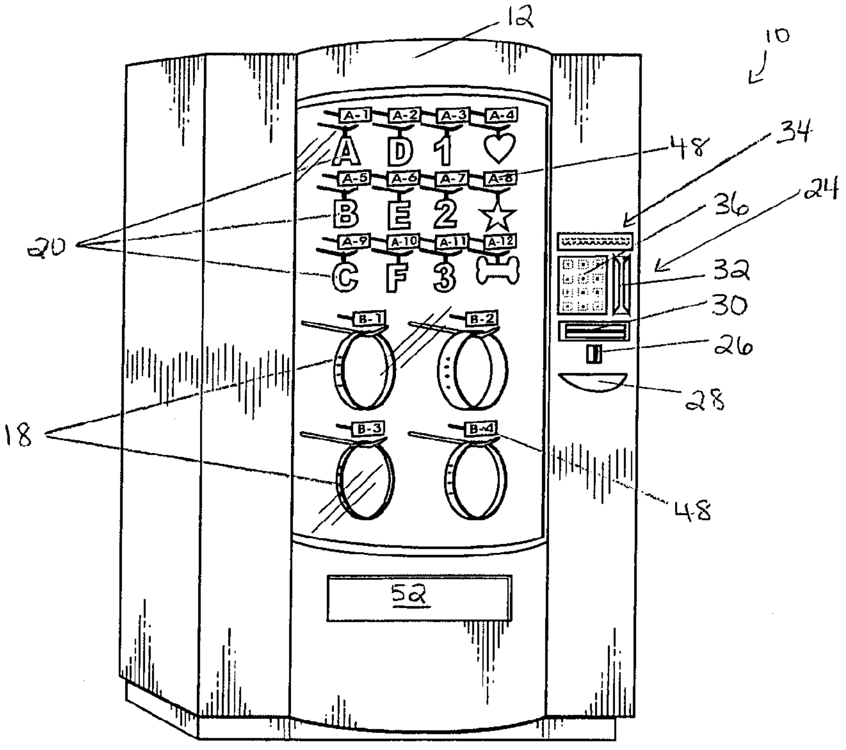
FIG. 2 is a perspective view of another embodiment of a vending system of the present invention.

FIGS. 1-2 refer to the preferred embodiments of the present invention. Together they show a vending system for personalized pet collars, hereinafter referred to as vending system 10. Preferably, the vending system 10 comprises a vending machine housing 12, a plurality of pet collars 18 stored in a pet collar storage area within the housing 12, a plurality of charms 20 stored in a charm storage area within the housing 12, a payment acceptor mechanism 24, a user interface mechanism 34, a control mechanism 38, a retrieval mechanism 40 (see FIG. 6), an assembly mechanism 42 (see FIG. 6), and a dispensing mechanism 44 (see FIG. 6).

Still referring to FIGS. 1 and 2, two embodiments of the vending system 10 are shown. The housing 12 is preferably substantially transparent so that the user may view the available types of pet collars 18 and charms 20 prior to assembly. While it is preferred that at least two types of pet collars 18 and at least two types of charms 20 are provided, it should be clearly understood that further substantial benefit may be derived from a vending system 10 having: 1) only one type of pet collar 18 and at least two types of charms 20; 2) at least two types of pet collars 18 and only one type of charm 20; or 3) only one type of pet collar 18 and only one type of charm 20. In one embodiment, as shown in FIG. 1, the user may also be able to view an assembly area 50 within the housing 12 to observe the pet collars 18 and charms 20 during their assembly. In another embodiment, as shown in FIG. 2, the assembly area 50 is concealed from the user. After assembly, the dispensing mechanism 44 (see FIG. 6) preferably dispenses the completed personalized pet collar 46 (see FIGS. 5 and 5A) into a retrieval area 52 so that the user may retrieve it.

The payment acceptor mechanism 24 preferably receives payment from a user and provides any required change to the user. Preferably, the payment acceptor mechanism 24 comprises a coin acceptor 26, a coin return 28, a bill acceptor 30, and a credit card acceptor 32. It should be clearly understood that the coin acceptor 26 may also accept tokens and it should be further understood that the credit card acceptor 32 may also accept debit cards and any other type of pre-paid payment cards. It should also be understood that the payment acceptor mechanism may accept a wireless authorization.

Initially, the user will select a pet collar 18 and any charms 20 that the user would like to be coupled to the pet collar 18. Though not required, there may be sample pet collars that are attached to the outside of the housing 12 and that are similar in size to the pet collars 18 stored within the housing 12. The sample pet collars may be labeled Small, Medium, Large, etc. and the pet collars 18 within the housing 12 may also be similarly labeled. The user may use the sample pet collars to size his/her pet to ensure that he/she selects a pet collar 18 of appropriate size.

The user interface mechanism 34 (see FIG. 6) preferably prompts the user to enter information corresponding to the pet collar 18 and any charms 20 that the user selects. It should be clearly understood that substantial benefit may still be derived from the user selecting a pet collar 18 without selecting any charms 20 to be coupled thereto. In order to do so, each type of pet collar 18 and charm 20 is preferably assigned a distinct identifier 48. Although the identifiers 48 are shown in the form of a letter and number combination, it should be clearly understood that substantial benefit may be derived from the use of an alternate form of identifier 48 so long as each pet collar 18 and charm 20 may be easily distinguished during their selection. The user interface mechanism 34 preferably comprises a computer touch-screen 36 for entering in the identifiers 48, but it should be clearly understood that substantial benefit may be derived from the use of a conventional keypad.

Figure 3:
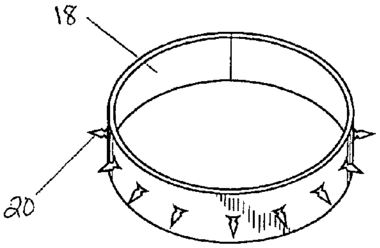
FIG. 3 is a perspective view of one embodiment of a pet collar of the present invention.
Figure 3A:
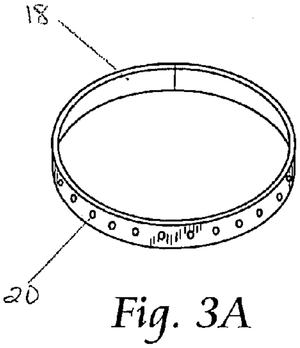
FIG. 3A is a perspective view of another embodiment of a pet collar of the present invention.
Figure 3B:
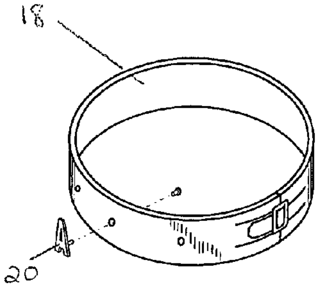
FIG. 3B is a perspective view of another embodiment of a pet collar of the present invention. A letter charm in the shape of the letter "A" is shown being riveted onto the pet collar.

Referring now to FIGS. 3-3B, three types of pet collars 18 are shown. It should be clearly understood that substantial benefit may be derived from the pet collars 18 being constructed of canvas, leather, or any other type of suitable material. Preferably, the charms 20 will be riveted onto the pet collar 18 (see FIG. 3B). It should be clearly understood, however, that further substantial benefit may be derived from the charms 20 being coupled in an alternative manner to the pet collar 18 so long as the charms 20 are securely fastened to the pet collar 18. It should also be clearly understood that substantial benefit may be derived from the charms 20 being coupled to the pet collar 18 by hooks and eyes, by chain link, or in any other such way as to allow the charms 20 to dangle from the pet collar 18.

Figure 4:
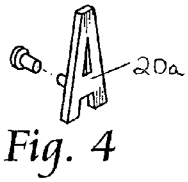
FIG. 4 is a perspective view of one embodiment of a letter charm of the present invention.
Figure 4A:
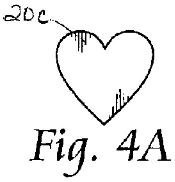
FIG. 4A is a front view of one embodiment of a design charm of the present invention.
Figure 4B:
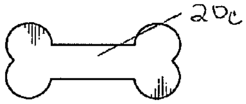
FIG. 4B is a front view of another embodiment of a design charm of the present invention.
Figure 4C:
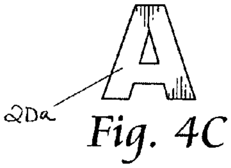
FIG. 4C is a front view of the letter charm of FIG. 4.
Figure 4D:
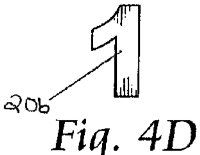
FIG. 4D is a front view of one embodiment of a number charm of the present invention.
Figure 4E:
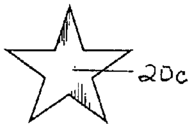
FIG. 4E is a front view of another embodiment of a design charm of the present invention.

As shown in FIGS. 4-4E, the charms 20 may be either letter charms 20*a* (see FIGS. 4 and 4C), number charms 20*b* (see FIG. 4D) or design charms 20*c* (see FIGS. 4A, 4B, and 4E). Although FIGS. 4 and 4C show a letter charm 20*a* (referred to generically as charm 20) as having the shape of the letter "A," it should be clearly understood that the letter charm 20*a* may be in the shape of any letter of the alphabet. And while FIG. 4D shows the number charm 20*b* (referred to generically as charm 20) as having the shape of the number "1," it should be clearly understood that the number charm 20*b* may be in the shape of any number 0-9. Finally, although FIGS. 4A, 4B, and 4E show the design charms 20*c* (referred to generically as charm 20) as having the shapes of a heart, a bone, and a star, it should be clearly understood that the design charms 20*c* may have any alternative design shapes.

Figure 5:
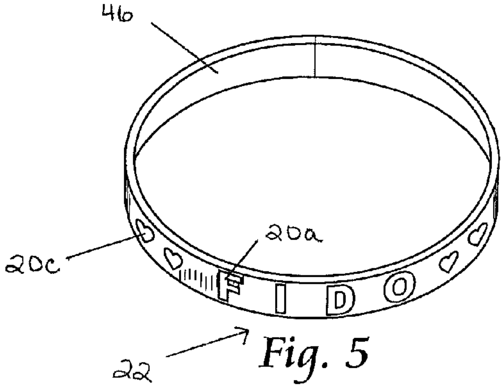
FIG. 5 is a perspective view of one embodiment of a completed personalized pet collar of the present invention. The completed personalized pet collar is shown as having letter charms riveted thereto and indicating the name of the pet.
Figure 5A:
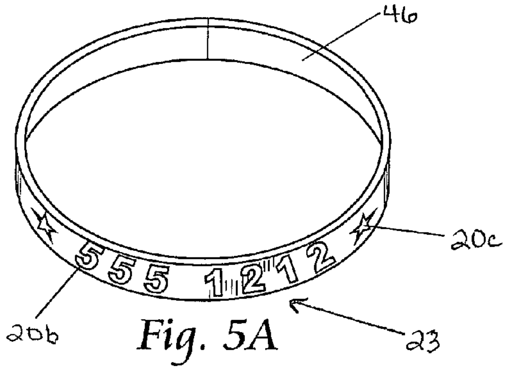
FIG. 5A is a perspective view of another embodiment of a completed personalized pet collar of the present invention. The completed personalized pet collar is shown as having number charms riveted thereto and indicating the pet owner's phone number.

Referring to FIGS. 5-5A, two completed personalized pet collars 46 are shown. Preferably, a user may enter information into the user interface mechanism 34 that corresponds to placement of the selected charms 20 on the selected pet collar 18. By doing so, the number charms 20*a* and the letter charms 20*b* may be combined to indicate a word 22 or a phrase. The number charms 20*a* and letter charms 20*b* may also be used to indicate the pet's name, the phone number 23 of the pet's owner, and/or the address of the pet's owner.

Statement of Operation

Figure 6:
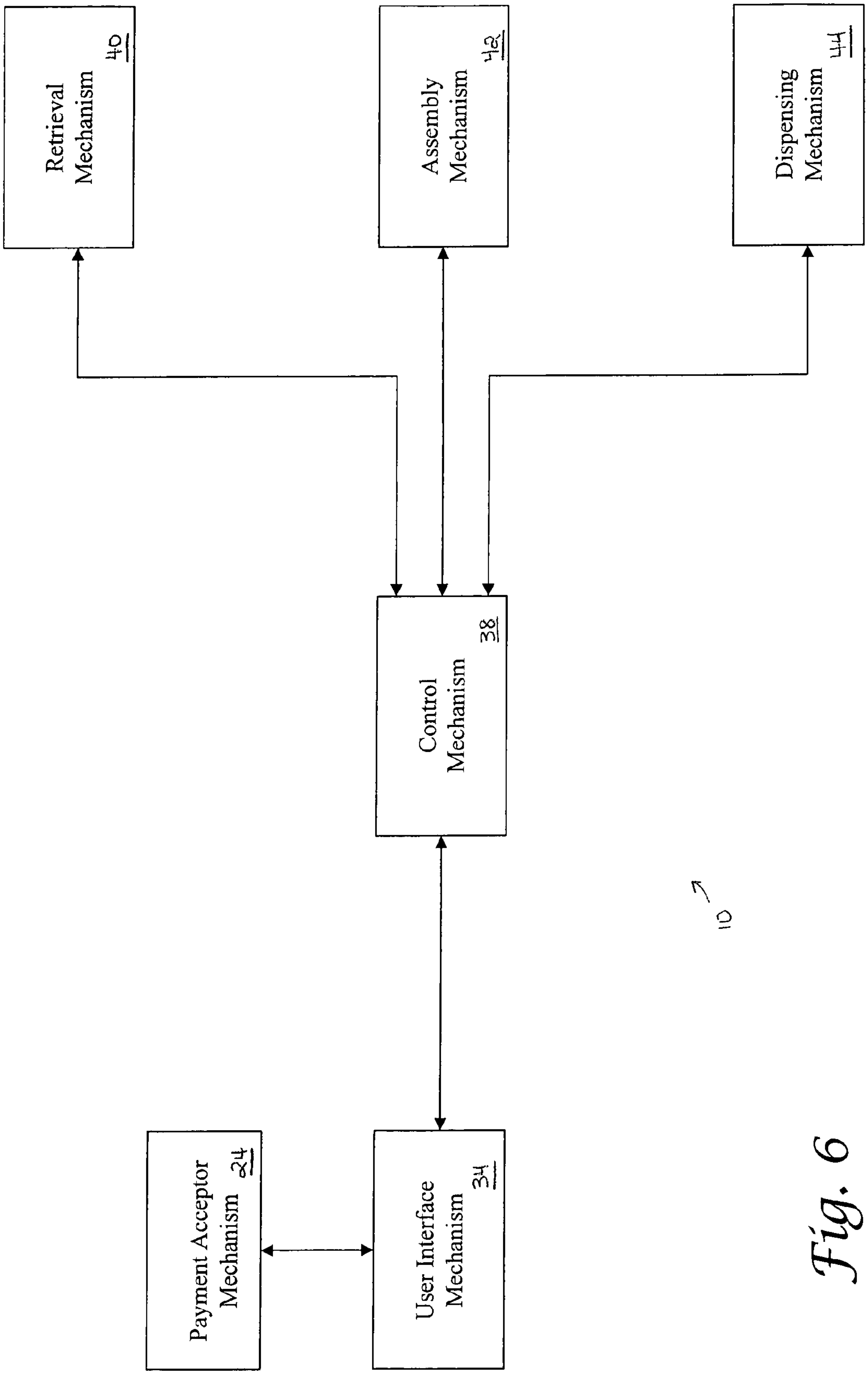
FIG. 6 is a block diagram illustrating a vending system for personalized pet collars consistent with an embodiment of the present invention.
Figure 7:
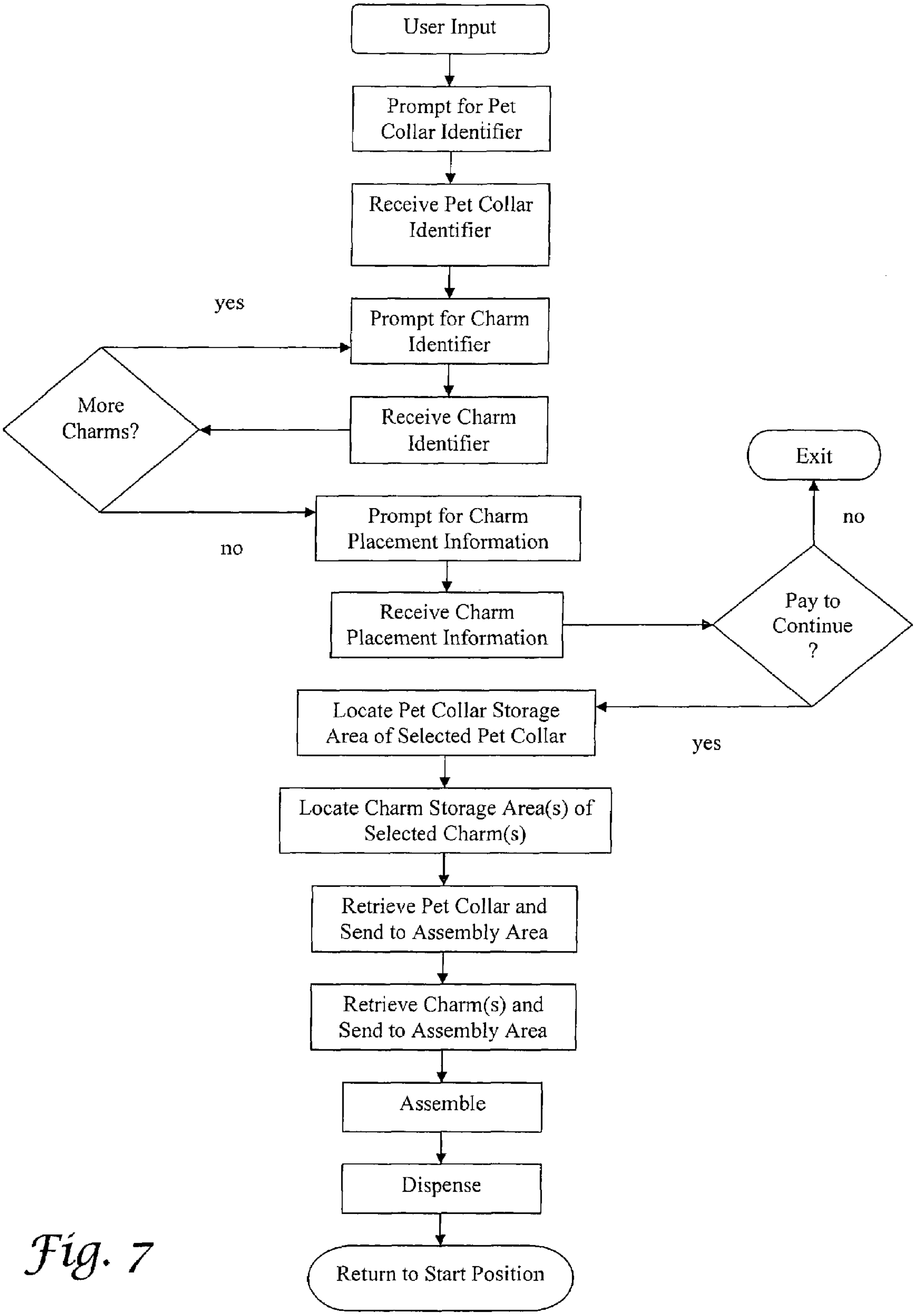
FIG. 7 is a flow chart illustrating a method of personalizing a pet collar consistent with an embodiment of the present invention.

FIGS. 6-7 depict the preferred operation of the vending system 10. Preferably, the user will first enter the information corresponding to the pet collar 18 (see FIGS. 1-3B) and any charms 20 (see FIGS. 1-2, and 3B-5A) that the user desires into the user interface mechanism 34. If the user wishes to have a word 22 (see FIG. 5), phrase, or phone number 23 (see FIG. 5A) indicated on the pet collar 18, the user may also enter information corresponding to placement of the charms 20 on the pet collar 18. Once all of the desired information is entered, the user interface mechanism 34 will preferably indicate the cost to make the pet collar 18 according to the user's specifications.

If the user wishes to continue, the user may then insert payment into the payment acceptor mechanism 24. Preferably, the payment acceptor mechanism 24 will accept coins, tokens, dollar bills, credit cards, debit cards, and any prepaid payment cards. If necessary, the payment acceptor mechanism 24 will also distribute change to the user.

Upon receiving adequate payment from the user, the user interface mechanism 34 sends the information entered by the user to a control mechanism 38. The control mechanism 38 then locates the pet collar 18 and any charms 20 selected by the user and then generates a drive signal. A retrieval mechanism 40 receives the drive signal and retrieves the selected pet collar 18 from its pet collar storage area and retrieves the selected charms 20 from their respective charm storage areas. The retrieval mechanism 40 also preferably places the pet collar 18 and the charms 20 into position in the assembly area 50 (see FIG. 1) for assembly.

After the retrieval mechanism 40 has placed the pet collar 18 and the charms 20 into the assembly area 50, the control mechanism 38 generates another drive signal to the assembly mechanism 42. The assembly mechanism 42 then rivets the charms 20 to the pet collar 18. If information corresponding to placement of the charms 20 had been entered, the assembly mechanism 42 rivets the charms 20 onto the pet collar 18 accordingly.

Once the personalized pet collar 46 (see FIGS. 5-5A) is completed, the control mechanism 38 generates another drive signal to the dispensing mechanism 44. The dispensing mechanism 44 then dispenses the completed personalized pet collar 46 into the retrieval area 52 (see FIGS. 1-2) for retrieval by the user.

While the invention has been particularly shown and described with reference to preferred embodiments thereof, it will be understood by those skilled in the art that the foregoing and other changes in form and details may be made therein without departing from the spirit and scope of the invention. For example, although the charms 20 are shaped as letters of the Roman alphabet, it should be clearly understood that the charms 20 may be shaped like letters of a different alphabet or like the characters of a symbolic language such as Chinese, Japanese, or Korean. And while it is shown that the number charms 20*a*, letter charms 20*b*, and design charms 20*c* are each shaped as the number, letter, or design it represents, it should be clearly understood that substantial benefit may be derived from standard shaped charms (e.g. square, rectangle, circle, etc.) having numbers, letters, or designs pre-printed or pre-engraved upon them. Any type of charm 20 may be used, whether constructed of metal, wood, cloth, rubber, etc. so long as the charm 20 is able to be coupled to the pet collar 18.

I claim:

1. A vending system for personalized pet collars comprising:

a vending machine housing, said housing containing a plurality of pet collars and a plurality of charms to be coupled to said pet collars;

at least one pet collar storage area within said housing, said at least one pet collar storage area being dimensioned to store said plurality of pet collars;

at least one charm storage area within said housing, said at least one charm storage area being dimensioned to store said plurality of charms;

a payment acceptor mechanism capable of at least one of receiving payment from a user and providing change to said user;

a user interface mechanism for prompting said user to enter information, said information corresponding to at least one of a pet collar selected by said user from said plurality of pet collars and at least one charm selected by said user from said plurality of charms;

a control mechanism for receiving said information and for locating said pet collar selected by said user and for locating said at least one charm selected by said user and for generating drive signals;

a retrieval mechanism for responding to at least one of said drive signals and for retrieving said pet collar selected by said user from said at least one pet collar storage area and for retrieving said at least one charm selected by said user from said at least one charm storage area and for placing said pet collar selected by said user and said at least one charm selected by said user in position for assembly;

an assembly mechanism for responding to at least one of said drive signals and for coupling said at least one charm selected by said user to said pet collar selected by said user; and a dispensing mechanism for responding to at least one of said drive signals and for dispensing a completed personalized pet collar.

2. The vending system of claim 1 wherein said information entered by said user further corresponds to placement of said at least one charm selected by said user on said pet collar selected by said user.

3. The vending system of claim 1 wherein said plurality of pet collars comprises at least two types of pet collars, each type of pet collar varying in at least one of size, style, and color.

4. The vending system of claim 3 wherein said at least one pet collar storage area being a plurality of pet collar storage areas, each pet collar storage area being dimensioned to store one said type of pet collar.

5. The vending system of claim 1 wherein said at least one pet collar storage area being refillable.

6. The vending system of claim 1 wherein said plurality of charms comprises at least two types of charms, each type of charm varying in at least one of size, style, and color.

7. The vending system of claim 6 wherein said type of charm being one of a number charm, a letter charm, and a design charm.

8. The vending system of claim 7 wherein said number charms and said letter charms being capable of indicating at least one of a word and a phrase.

9. The vending system of claim 6 wherein said at least one charm storage area being a plurality of charm storage areas, each charm storage area being dimensioned to store one said type of charm.

10. The vending system of claim 1 wherein said at least one charm storage area being refillable.

11. The vending system of claim 1 wherein said housing being substantially transparent so that said user may view said plurality of pet collars and said plurality of charms prior to assembly.

12. The vending system of claim 1 wherein said housing being substantially transparent so that said user may view said plurality of pet collars and said plurality of charms during assembly.

13. A vending system for personalized pet collars comprising:

a substantially transparent vending machine housing;

a plurality of pet collars, said plurality of pet collars comprising at least two types of pet collars, each type of pet collar varying in at least one of size, style, and color;

a plurality of charms to be riveted to said pet collars, said plurality of charms comprising at least two types of charms, each type of charm varying in at least one of size, style, and color;

a plurality of refillable pet collar storage areas, each pet collar storage area being dimensioned to store one said type of pet collar;

a plurality of refillable charm storage areas, each charm storage area being dimensioned to store one said type of charm;

a payment acceptor mechanism capable of at least one of receiving payment from a user and providing change to said user;

a user interface mechanism prompting a user to enter information, said information corresponding to at least one of a pet collar selected by said user from said plurality of pet collars, at least one charm selected by said user from said plurality of charms, and placement of said at least one charm selected by said user on said pet collar selected by said user;

a control mechanism for receiving said information and for locating said pet collar selected by said user and for locating said at least one charm selected by said user and for generating drive signals;

a retrieval mechanism for responding to at least one of said drive signals and for retrieving said pet collar selected by said user from said at least one pet collar storage area and for retrieving said at least one charm selected by said user from said at least one charm storage area and for placing said pet collar selected by said user and said at least one charm selected by said user in position for assembly;

an assembly mechanism for responding to at least one of said drive signals and for riveting said at least one charm selected by said user to said pet collar selected by said user; and a dispensing mechanism for responding to at least one of said drive signals and for dispensing a completed personalized pet collar.

14. The vending system of claim 13 wherein said type of charm being one of a number charm, a letter charm, and a design charm.

15. The vending system of claim 14 wherein said number charms and said letter charms being capable of indicating at least one of a word and a phrase.

16. A method of personalizing a pet collar comprising the steps of:

providing a vending system comprising:

a vending machine housing, said housing containing a plurality of pet collars and a plurality of charms to be coupled to said pet collars;

at least one pet collar storage area within said housing, said at least one pet collar storage area being dimensioned to store said plurality of pet collars;

at least one charm storage area within said housing, said at least one charm storage area being dimensioned to store said plurality of charms;

a payment acceptor mechanism capable of at least one of receiving payment from a user and providing change to said user;

a user interface mechanism for prompting said user to enter information, said information corresponding to at least one of a pet collar selected by said user from said plurality of pet collars and at least one charm selected by said user from said plurality of charms;

a control mechanism for receiving said information and for locating said pet collar selected by said user and for locating said at least one charm selected by said user and for generating drive signals;

a retrieval mechanism for responding to at least one of said drive signals and for retrieving said pet collar selected by said user from said at least one pet collar storage area and for retrieving said at least one charm selected by said user from said at least one charm storage area and for placing said pet collar selected by said user and said at least one charm selected by said user in position for assembly;

an assembly mechanism for responding to at least one of said drive signals and for coupling said at least one charm selected by said user to said pet collar selected by said user; and a dispensing mechanism for responding to at least one of said drive signals and for dispensing a completed personalized pet collar;

receiving payment from said user by said payment acceptor mechanism;

receiving by said user interface mechanism said information entered by said user, said information corresponding to at least one of said pet collar selected by said user from said plurality of pet collars and said at least one charm selected by said user from said plurality of charms;

locating by said control mechanism said pet collar selected by said user and said at least one charm selected by said user;

generating drive signals by said control mechanism;

retrieving by said retrieval mechanism said pet collar selected by said user from said at least one pet collar storage area and placing said pet collar selected by said user in position for assembly;

retrieving by said retrieval mechanism said at least one charm selected by said user from said at least one charm storage area and placing said at least one charm selected by said user in position for assembly;

coupling by said assembly mechanism said at least one charm selected by said user to said pet collar selected by said user; and dispensing by said dispensing mechanism a completed personalized pet collar for retrieval by said user.

17. The method of claim 16 wherein said plurality of charms comprises at least two types of charms, each type of charm being one of a number charm, a letter charm, and a design charm.

18. The method of claim 17 further comprising the step of combining a plurality of at least one of said number charms and said letter charms to indicate the identity of a pet receiving said personalized pet collar.

19. The method of claim 16 wherein said information entered by said user further corresponds to placement of said at least one charm selected by said user on said pet collar selected by said user.

20. The method of claim 19 further comprising the steps of:

receiving said information entered by said user into said user interface mechanism, said information corresponding to placement of said plurality of charms selected by said user on said pet collar selected by said user;

retrieving said plurality of charms selected by said user and placing said plurality of charms selected by said user in position for assembly according to said information corresponding to placement of said plurality of charms selected by said user; and coupling said plurality of charms selected by said user to said pet collar selected by said user according to said information corresponding to placement of said plurality of charms selected by said user.

* * * * *